United States Patent [19]

Scales

[11] 4,188,242
[45] Feb. 12, 1980

[54] COMBINATION CARBURIZING AND BORONIZING METHODS

[75] Inventor: Stanley R. Scales, Houston, Tex.

[73] Assignee: Hughes Tool Company, Houston, Tex.

[21] Appl. No.: 915,094

[22] Filed: Jun. 13, 1978

Related U.S. Application Data

[60] Continuation of Ser. No. 803,906, Jun. 6, 1977, abandoned, which is a continuation of Ser. No. 622,929, Oct. 16, 1975, abandoned, which is a division of Ser. No. 387,566, Aug. 10, 1973, Pat. No. 3,922,038.

[51] Int. Cl.$^2$ .......................... C21D 9/22; E21B 13/00
[52] U.S. Cl. .................................. 148/15.5; 148/16.5; 148/31.5
[58] Field of Search ................. 148/16, 16.5, 15, 15.5, 148/31.5, 39, 27

[56] References Cited

U.S. PATENT DOCUMENTS

| 3,223,188 | 12/1965 | Coulter et al. | 148/31.5 |
| 3,294,595 | 12/1966 | Whodek | 148/15.5 |
| 3,806,374 | 4/1974 | Krzyminski | 148/31.5 |
| 3,811,961 | 5/1974 | Weinstein et al. | 428/548 |
| 3,842,921 | 10/1974 | Dill et al. | 148/31.5 |

Primary Examiner—Arthur J. Steiner
Attorney, Agent, or Firm—Robert A. Felsman

[57] ABSTRACT

Disclosed herein are treatments for the manufacture of wear resistant steel surfaces, which are carburized, boronized, quenched and tempered for extreme surface hardness, with a strong, tough supporting base that minimizes fracturing of the brittle boronized case.

5 Claims, 2 Drawing Figures

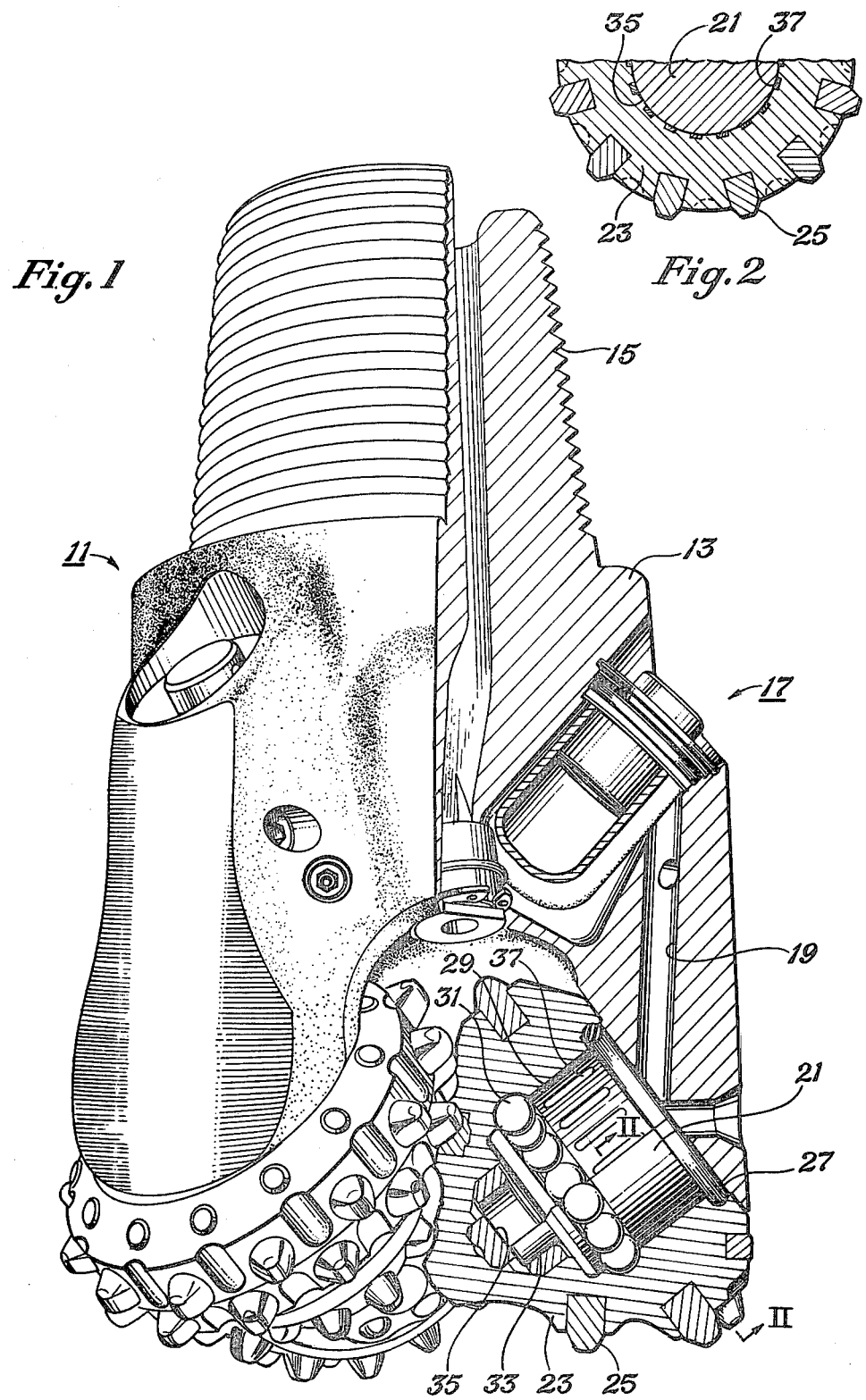

COMBINATION CARBURIZING AND BORONIZING METHODS

CROSS REFERENCE TO RELATED APPLICATIONS

This is a continuation of application Ser. No. 803,906, filed June 6, 1977, now abandoned which was a continuation of application Ser. No. 622,929, filed Oct. 16, 1975, now abandoned, which was a division of application Ser. No. 387,566, filed Aug. 10, 1973, now U.S. Pat. No. 3,922,038.

BACKGROUND OF THE INVENTION

1. Field of the Invention

This invention relates in general to surface treatments of metals, particularly to those for steels requiring exceptional wear resistance under heavy loads such as those imposed upon earth boring drill bit bearings.

2. Description of the Prior Art

It has long been known that the surfaces of metals such as steel may be treated with a variety of elements or compositions that combine with the constituents of steel to produce hard wear resistant surfaces. One of the known prior art treatments is carburization. Another is boronizing.

The bearing surfaces of rotatable cutters in earth boring drill bits are commonly carburized, hardened and tempered to increase their wear resistance. Such surfaces sometimes have regions of soft anti-galling material such as silver or silver alloy, as disclosed in U.S. Pat. No. 3,235,316. The mating surfaces of the opposing bearings shafts often include deposits of hard metal of cobalt based alloy of the "Stellite" series.

Boronizing of the bearing surfaces of earth boring drill bits has not heretofore been commercially successful, principally due to the brittle nature of the hard surfaces and their shallow depth.

SUMMARY OF THE INVENTION

This invention relates to the discovery that a wear resistant surface for steel such as a bearing surface in an earth boring drill bit may be constructed advantageously by a process that includes carburization, boronizing the resulting carburized surface, hardening in a manner to protect the boronized case from decarburizing, and then tempering. By carburizing and boronizing to the requisite depths, hardening in a manner to produce a martensitic grain structure in the carburized case, and tempering to thereafter produce tempered martensite, a surface of extreme hardness results with a strong and tough supporting base. This base minimizes fracturing of the brittle boronized case since it is resistant to deformation and provides a satisfactory support for the boronized case.

BRIEF DESCRIPTION OF THE DRAWING

FIG. 1 is a fragmentary perspective view, partially in section, showing an earth boring drill bit and typical bearing which receives the metallurgical treatment described herein.

FIG. 2 is a cross-sectional view as seen looking along the lines II—II of FIG. 1.

DESCRIPTION OF THE PREFERRED EMBODIMENTS

The numeral 11 in the drawing designates an earth boring drill bit having a plurality of head sections or legs 13 joined by suitable means such as welding (not shown) and threaded at 15 for attachment to a supportive drill string member. One of the prior art lubrication and compensator systems 17, such as illustrated in FIG. 1, feeds lubricant through a passageway 19 and into a bearing region formed between a cantilevered shaft or pin 21 of the head section and a rotatable cutter 23 having teeth 25 for disintegrating earth. Suitable seal means 27 prevent the escape of lubricant from the bearing region, as explained in U.S. Pat. No. 3,397,928.

The above mentioned bearings in an earth boring drill often include a primary friction region 29, an anti-friction ball bearing and cutter retainer region 31, and radial and thrust friction bearing regions designated respectively 33 and 35.

FIG. 2 shows in cross-section the cantilevered bearing pin 21 and rotatable cutter 23. The cylindrical surface 35 of the bearing pin 21 receives the special treatment of the present invention, while the opposing surface of the rotatable cutter 23 receives a prior art treatments such as that described in U.S. Pat. No. 3,235,316, preferably that using silver alloy. This patent teaches that improved friction bearings for earth boring drill bits result from the use of indentations filled with a soft anti-galling material such as silver or silver alloy 37 in a surface having a hardness and wear resistance comparable to carburized and hardened steel.

As previously stated this invention utilizes four primary method or process steps: carburizing, boronizing, hardening and tempering, each of which will be described separately by way of example. The initial step in the method of this invention requires carburization of a steel bearing surface such as the primary friction bearing region 29. One of the prior art carburization methods may be used. Gas carburizing is a well known art and is the preferred method. It is described on pp. 93–114 of Volume 2 of the 8th Edition of the Metals Handbook, "Heat Treating, Cleaning and Finishing" (1964, American Society for Metals). An example of the gas carburizing of the bearing surfaces of a selectively copper plated rock bit head section made of A.I.S.I. 4815 steel is as follows:

Carburizing temperature: 1700° F.

Carburizing time: Nine hours at 1700° F.

Carburizing atmosphere: Generated endothermic gas enriched with methane to have a carbon potential of 1.35% carbon. A typical analysis of the carburizing gas (atmosphere) is as follows:

40% $N_2$
20% CO ($CO_2$ about 0.05%)
38% $H_2$
2% $CH_4$

This produces a carburized case depth of about 0.065" with carbon content at the surface about 1.00%.

Pack carburizing is another well known art that may be used. It is described on pp. 114–118 of Volume 2 of the same Metals Handbook. An example of pack carburizing of the bearing surfaces of a rock bit head section made of A.I.S.I. 4815 steel is as follows:

Carburizing compound (packed around the surface to be carburized): Charcoal, 90% (6 to 14 mesh size), energized with about 4% $BaCO_3$ and about 1.5% $CaCO_3$.

Carburizing temperature: 1700° F.

Carburizing time: a Nine hours at 1700° F.

This produces a carburized case depth of about 0.065" with carbon content at the surface about 1.00%.

Liquid carburizing is another well known art to the metals industry. It is described on pp. 133–145 of Volume 2 of the same Metals Handbook. While not actually used for this invention, it is anticipated that nine hours at 1700° F. in a salt bath containing about 6–16% sodium cyanide and 30–55% barium chloride would produce a satisfactory carburized case to a depth of about 0.065".

The second step of the method of this invention is boronizing of the previously carburized surfaces. Pack boronizing is the preferred technique and is a relatively new art.

An example of boronizing a carburized bearing surface of an A.I.S.I. 4815 steel head section is as follows:

Compound: Boronizing powder was packed around the carburized bearing surface. This powder was 90% finer than 150 mesh, had 40–80% $B_4C$, 2–40% (graphite), 1–4% $KHCO_3$, with remainder up to 20% in impurities.

Boronizing temperature: 1650° F. (in a carburizing atmosphere).

Boronizing time: 5 hours at temperature in a furnace with a carbon potential of 1.00%. This produced a boronized case depth of about 0.004 inch. Longer boronizing times and/or higher boronizing temperatures can be used for deeper boronized case depth, but a 0.001 to 0.010 inch deep boronized case has less tendency to crack or spall than a deeper case.

Gas boronizing is an alternate technique in the prior art. It is described in U.S. Pat. No. 2,494,267, "Surface Hardening of Ferrous Metals", Schlesinger and Schaffer, Jan. 10, 1950. The method described utilizes gaseous diborane ($B_2H_6$) at about 700° C. (1292° F.).

Liquid boronizing is another prior art boronizing method. It is described in two papers: "Boronizing of Steel" by D. C. Durrill and Dr. Donald D. Allen, Magnetic Propulsion Systems, Inc. and "Boriding Steels for Wear Resistance" by Howard C. Fielder and Richard J. Sieraski, General Electric Co. (*Metal Progress*, February 1971, pp. 101–107).

Neither gives the liquid salt bath composition, but the latter paper states that it contains flourides of lithium, sodium, potassium, and boron. Temperatures and times reported vary from 1450° F.–1650° F. and from 15 minutes to 36 hours.

The third and fourth steps in the method of this invention are hardening and tempering of the carburized, boronized and cleaned steel surfaces.

The hardening and tempering of carburized steel is a well known art. The hardening, usually quenching in agitated oil, from a temperature of at least 1390° F. can be performed using one of several procedures, such as the following two for carburized A.I.S.I. 4815 steel and produces a martensitic case:

(a) Single quench from a carburizing or reducing atmosphere and a temperature of 1500° F.

(b) Double quench from a carburizing or reducing atmosphere and temperatures of respectively 1550° F. and 1435° F.

Quenching from a carburizing or reducing atmosphere prevents decarburization or oxidation of the boronized case. Or a suitable coating such as copper plating may be used. A suitable atmosphere is one similar to the previously explained methane enriched endothermic gas except slightly higher in $CO_2$ (about 0.4 to 0.8%) because of the lower temperatures.

The tempering temperature is usually low, 290° F.–510° F., preferably about 330° F. for one hour, to toughen the carburized case without appreciably lowering its strength (hardness) to produce tempered martensite.

The above described procedures are utilized to produce a carburized foundation on the steel bearing pin 21 of at least 0.060 inch. The boronizing procedure produces a boronized case of at least 0.001 inch (average about 0.004 inch) with a surface hardness in a range of 900 to 2100 KHN. The hardening and tempering procedure develops a hardness in the carburized foundation in a range of 50 to 64 Rockwell "C" (550 to 800 KHN). When such a bearing pin is assembled with a rotatable cutter of the type shown in the drawing and described in U.S. Pat. No. 3,235,316, overall bearing performance is much improved over that obtainable with a carburized bearing surface. results indicate that such a surface performs comparably with much more expensive procedures such as when utilizing a deposit of hard metal of the cobalt based "Stellite" series in a groove on the bearing pin.

While the invention has been described in only a few of its forms it should be apparent to those skilled in the art that it is not so limited but is susceptible to various changes and modifications without departing from the spirit thereof.

I claim:

1. The method of manufacturing steel articles requiring a strong and tough wear resistant surface, said method comprising the steps of:

first, carburizing said surface, after said article has been formed, in a carbon rich environment in a furnace at a time and temperature to produce a carburized case of selected depth;

second pack boronizing said carburized case in a boron compound in a furnace at a time and temperature to produce a boronized case;

third, hardening said carburized case by quenching after heating to a temperature and cooling at a rate to produce martensite; and fourth, tempering said carburized case by heating to a temperature to produce tempered martensite;

whereby the wear resistant boronized surface has a tough and strong supporting base to sustain large loads and avoid brittle fracture.

2. The method of manufacturing steel articles requiring a strong and tough wear resistant surface, said method comprising the steps of:

first, carburizing said surface in a carbon rich environment in a furnace at a time and temperature to produce a case depth of at least 0.030 inch;

second, pack boronizing said carburized case in a boron compound in a furnace at a time and temperature to produce a boronized case to a depth of at least 0.001 inch;

third, hardening said carburized case by quenching after heating to a temperature and cooling at a rate to produce martensite; and fourth, tempering said carburized case by heating to a temperature to produce tempered martensite;

whereby the wear resistant boronized surface has a tough and strong supporting base to sustain large loads and avoid brittle fracture.

3. The method of manufacturing steel articles requiring a strong and tough wear resistant surface, said method comprising the steps of:

first, carburizing said surface in a carbon rich environment in a furnace at a time and temperature to produce a carburized case of selected depth of at least 0.030 inch;

second, pack boronizing said carburized case in a furnace with a compound of B₄C at a time and temperature to produce a depth of at least 0.001 inch;

third, quenching said carburized case from a temperature to produce a martensitic grain structure; and fourth, tempering said carburized case to produce a tempered martensitic grain structure;

whereby the wear resistant boronized surface has a tough and strong supporting base to sustain large loads and avoid brittle fracture.

4. The method of manufacturing steel articles requiring a strong and tough wear resistant surface, said comprising the steps of:

first, carburizing said surface after said article has been finally formed at a time and temperature to produce a case depth of at least 0.030 inch;

second, pack boronizing said carburized case in a furnace with a compound consisting essentially of B₄C and graphite at a time and temperature to produce a depth of at least 0.001 inch;

third, quenching said carburized case from a temperature of at least 1390° F. to produce a martensitic grain structure; and fourth, tempering said carburized case at a temperature of at least 290° F. to produce a tempered martensitic grain structure;

whereby the wear resistant boronized surface has a tough and strong supporting base to sustain large loads and avoid brittle fracture.

5. The method of manufacturing steel articles requiring a strong and tough wear resistant surface, said method comprising the steps of:

first, carburizing said surface in a carbon rich environment at about 1700° F. for about nine hours to produce a case depth of about 0.065 inch;

second boronizing said carburized case by packing a boronizing powder consisting essentially of boron carbide and graphite around the carburized surface, and heating the article in a furnace having a non-oxidizing atmosphere at a temperature of about substantially 1650° F. for about five hours to produce a depth of about 0.004 inch;

third quenching said carburized case from a temperature of at least substantially 1390° F. to produce a martensitic grain structure; and fourth tempering said carburized case from a temperature within a range of substantially 290° F. through 510° F. for about one hour to produce a tempered martensitic grain structure;

whereby the wear resistant boronized surface has a tough and strong supporting base to sustain large loads and avoid brittle fracture.

* * * * *